Figure 1:
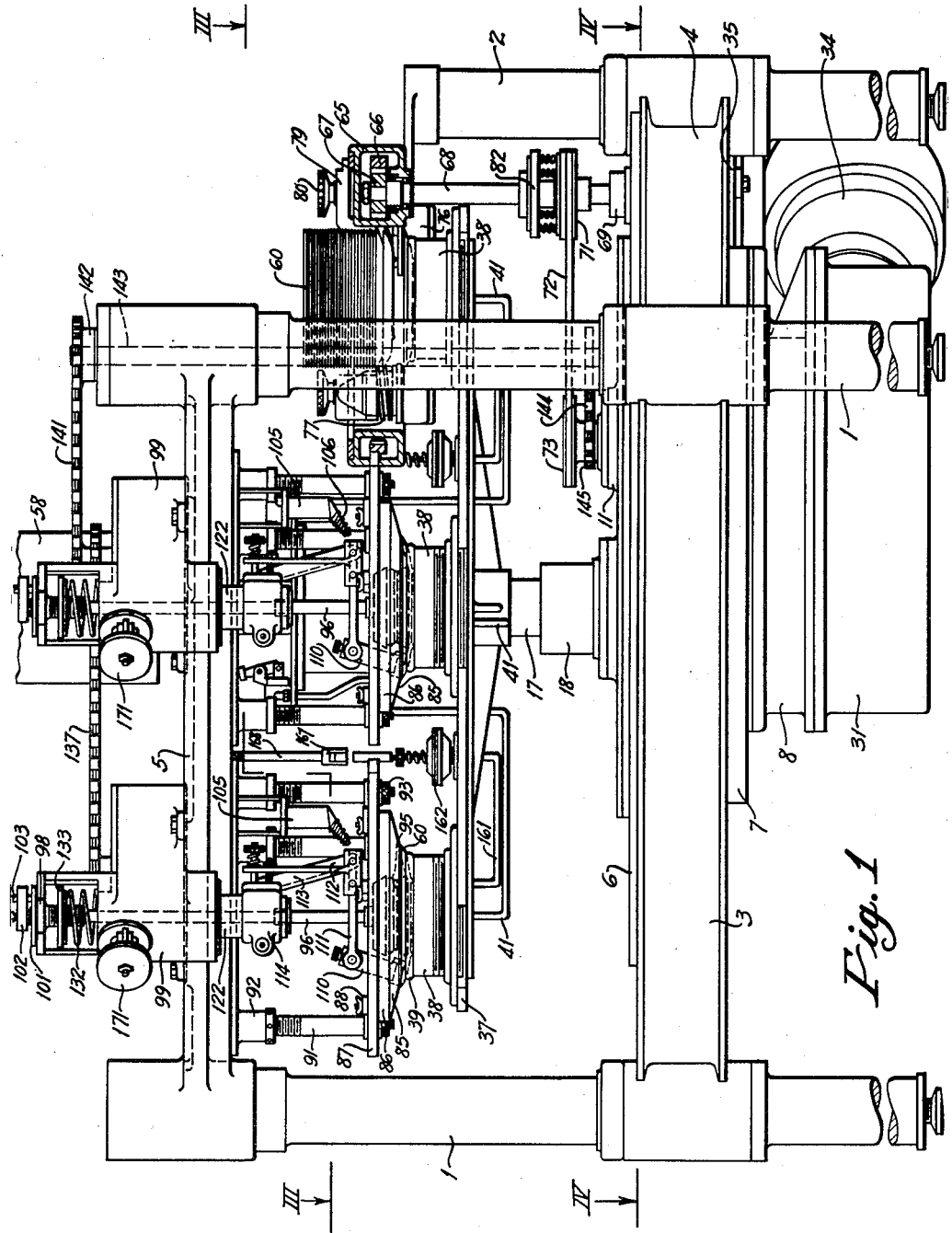

Oct. 26, 1954 C. J. CONKLE 2,692,552
DINNERWARE DECORATING MACHINE
Filed Jan. 23, 1952 6 Sheets-Sheet 2

INVENTOR.
CHARLES J. CONKLE
BY
Brown, Critchlow, Flick & Peckham

Oct. 26, 1954 C. J. CONKLE 2,692,552
DINNERWARE DECORATING MACHINE
Filed Jan. 23, 1952 6 Sheets-Sheet 3

INVENTOR.
CHARLES J. CONKLE
BY
Brown, Critchlow, Flick & Peckham

Oct. 26, 1954 C. J. CONKLE 2,692,552
DINNERWARE DECORATING MACHINE
Filed Jan. 23, 1952 6 Sheets-Sheet 4

INVENTOR.
CHARLES J. CONKLE
BY
Brown, Critchlow Flick & Peckham

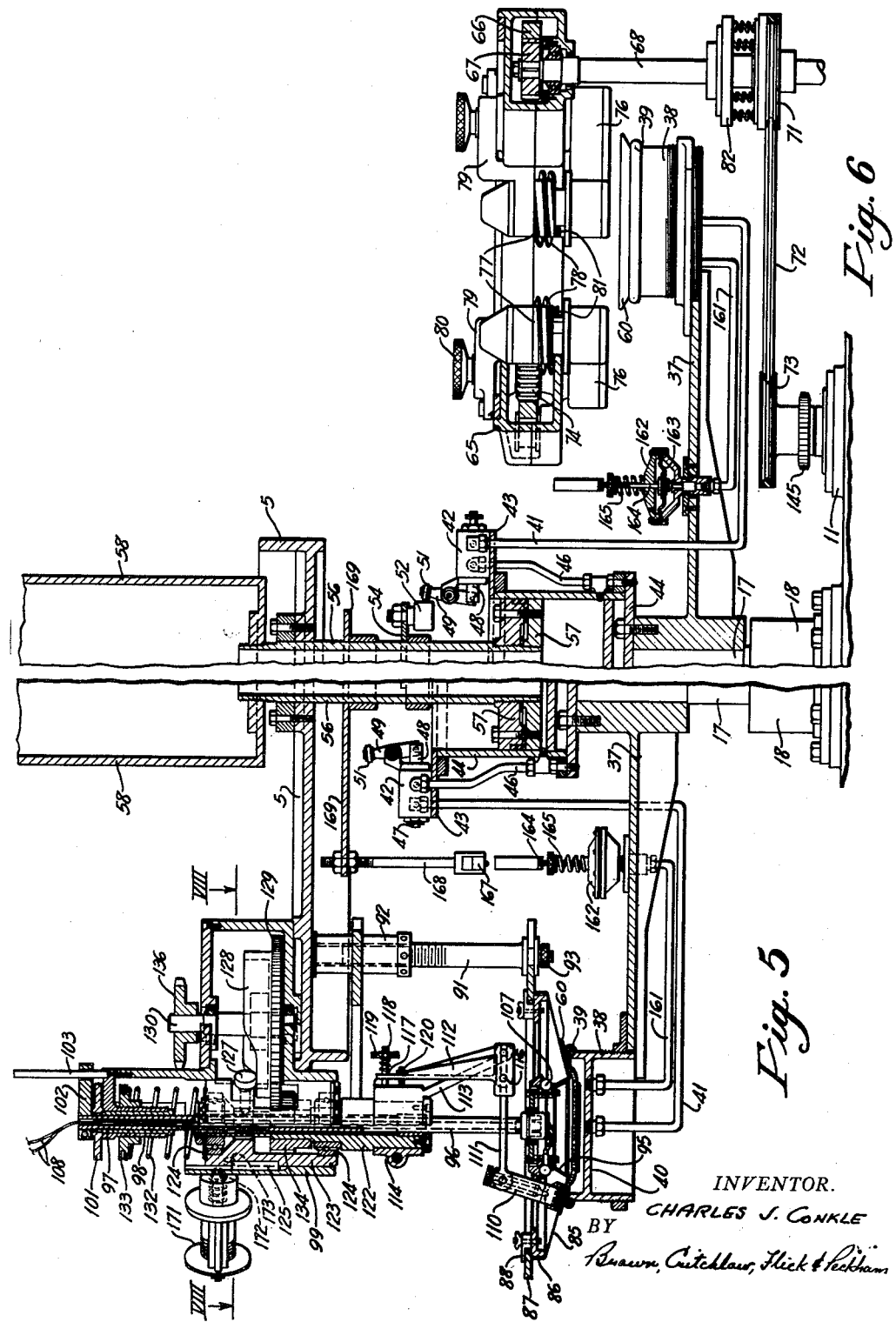

Oct. 26, 1954  C. J. CONKLE  2,692,552
DINNERWARE DECORATING MACHINE
Filed Jan. 23, 1952  6 Sheets-Sheet 6

INVENTOR.
CHARLES J. CONKLE
BY
Brown, Critchlow, Flick & Peckham

UNITED STATES PATENT OFFICE 2,692,552

DINNERWARE DECORATING MACHINE

Charles J. Conkle, East Liverpool, Ohio, assignor to The Homer Laughlin China Company, Newell, W. Va., a corporation of Delaware Application January 23, 1952, Serial No. 267,808

6 Claims. (Cl. 101—115)

This invention relates to dinnerware decorating machines, and more particularly to a machine for printing a decoration in a plurality of colors on an article of dinnerware.

The principal problem in printing a multi-color decoration on an article of dinnerware concerns registration of the different colors used. Obviously, the registration should be as perfect as possible. The difficulty of securing perfect registration in an automatic machine can be appreciated when it is realized that either the ware or the decorating apparatus must move from one station to another and toward and away from one another. Every change in relative positions between the ware and decorating members makes registration harder to obtain.

It is among the objects of this invention to provide a machine which will print a multi-color decoration on an article of ware with the different colors registering with one another, which permits each color to be applied by a separate decorating device at a different station, which allows any reasonable number of colors to be used, and which decorates ware rapidly enough to be commercially practicable.

In accordance with this invention, the ware is placed on chucks which are mounted in predetermined positions at circumferentially spaced intervals on a rotatable horizontal table. The ware is centered on the chucks and then is held in that position by suction or some other means while it is being decorated by different decorating devices to which each chuck is moved in succession. The chucks are moved from station to station by intermittently rotating the table. During the periods when the table is not rotating, the ware and the decorating devices above the chucks at some of the stations are brought into engagement, preferably by raising the table. A different color is applied to the ware at each station. With this apparatus the decorating devices can be mounted in fixed positions, and since the ware also is held in fixed position on the table, each successive color can be made to register with the preceding color that is applied to the ware. Moving the table up and down, instead of the decorating devices, means that there is only one moving part which has to be controlled in order to assure registration of the different colors on the ware. This invention is especially applicable to silk screen decorating, in which case means is provided to prevent any squeegee from engaging its screen in the event the ware below it is not positioned properly on a chuck.

Figure 2:
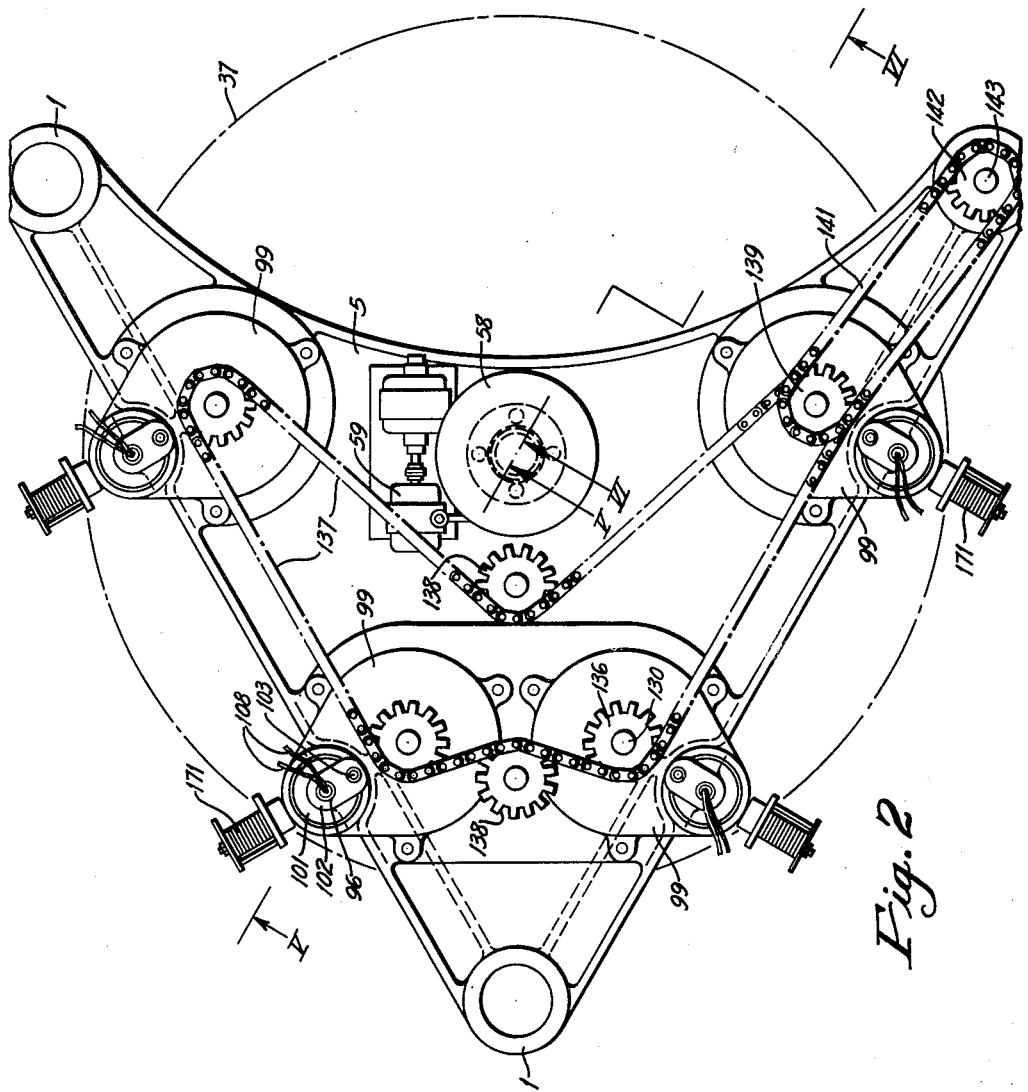
Figure 3:
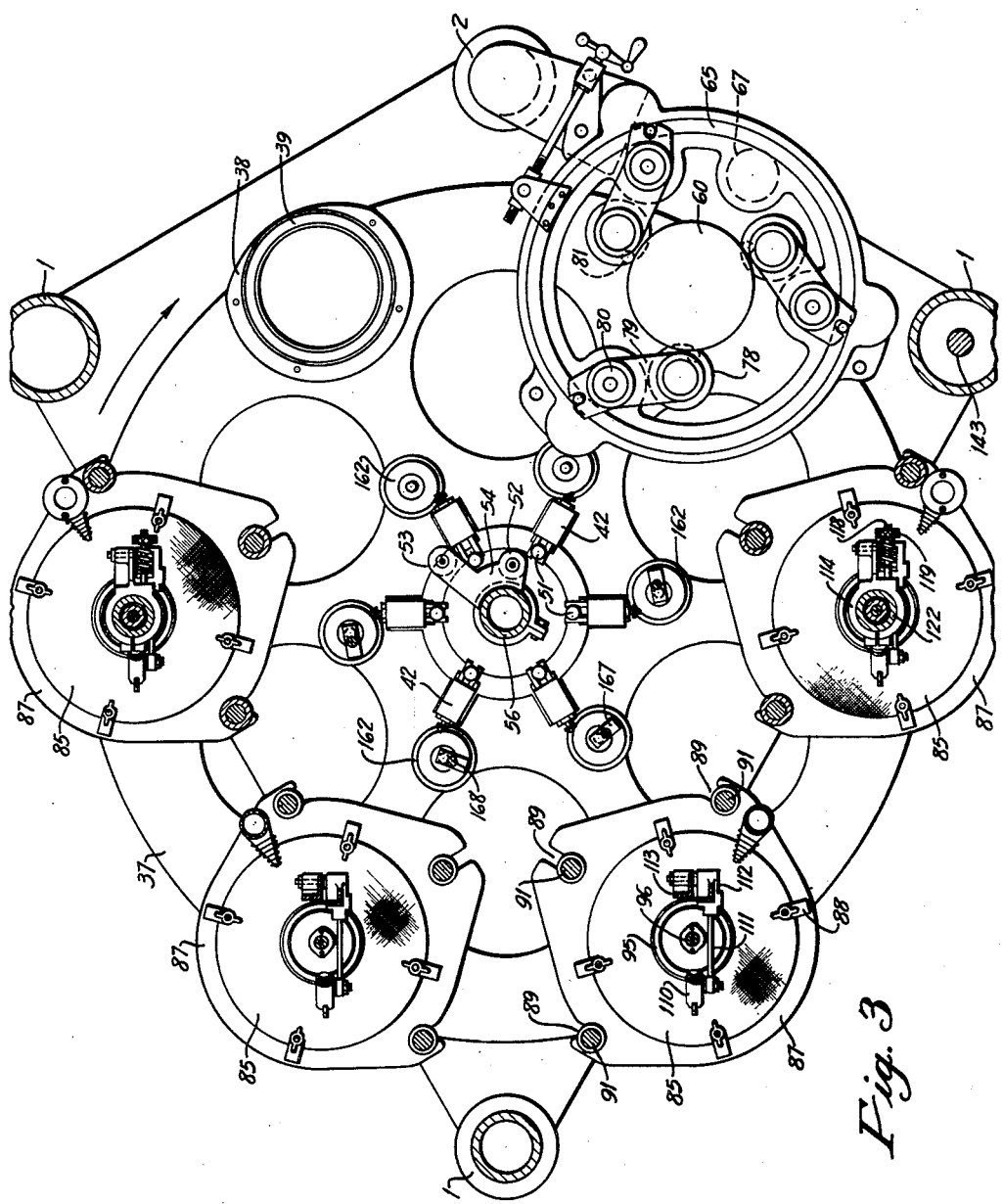
Figure 4:
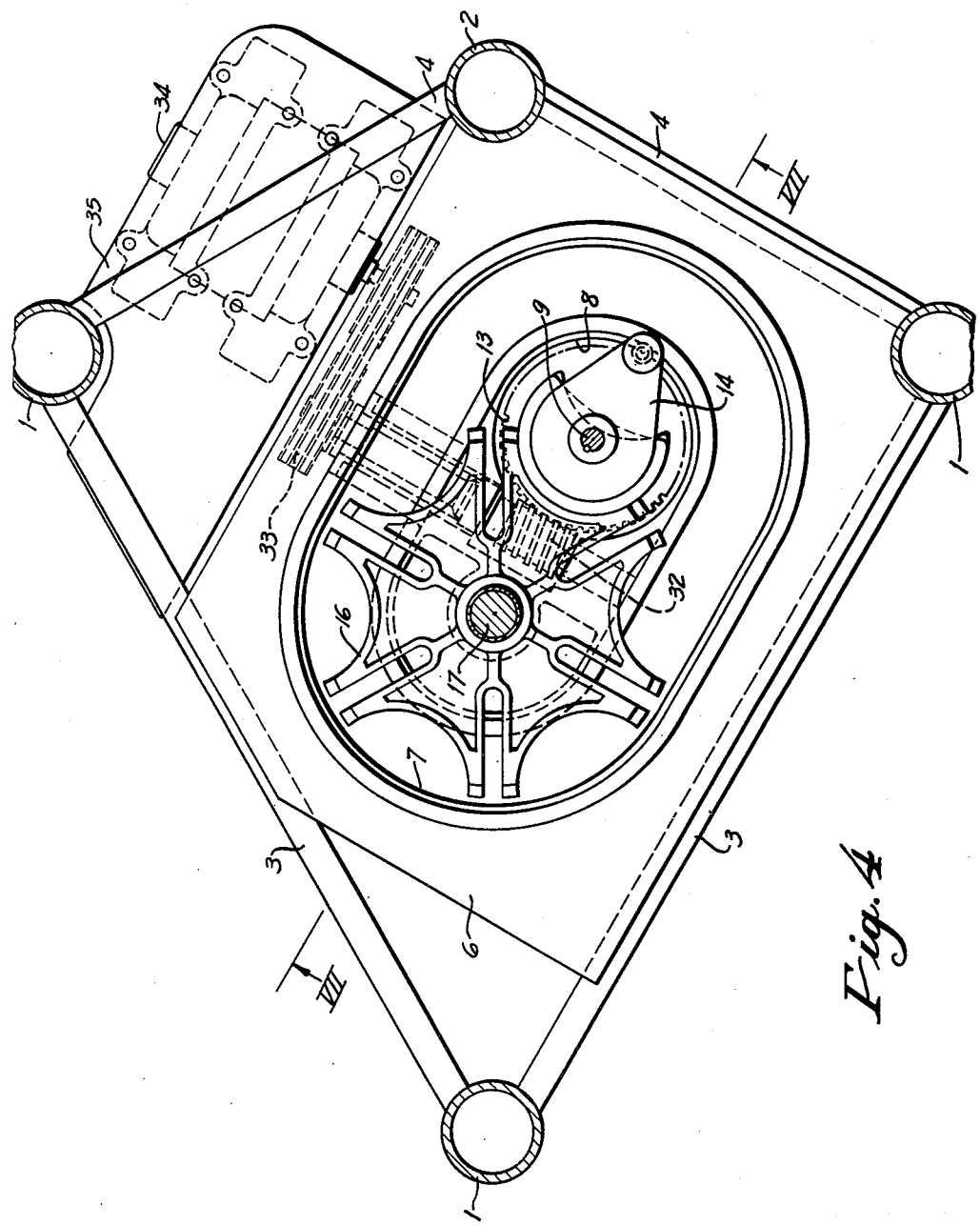
Figure 9:
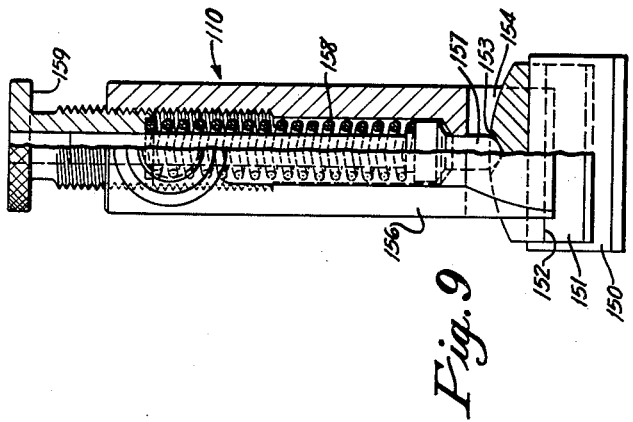
Figure 10:
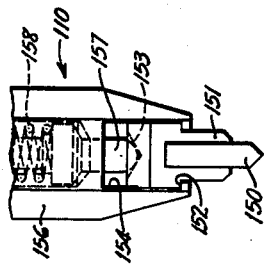
Figure 7:
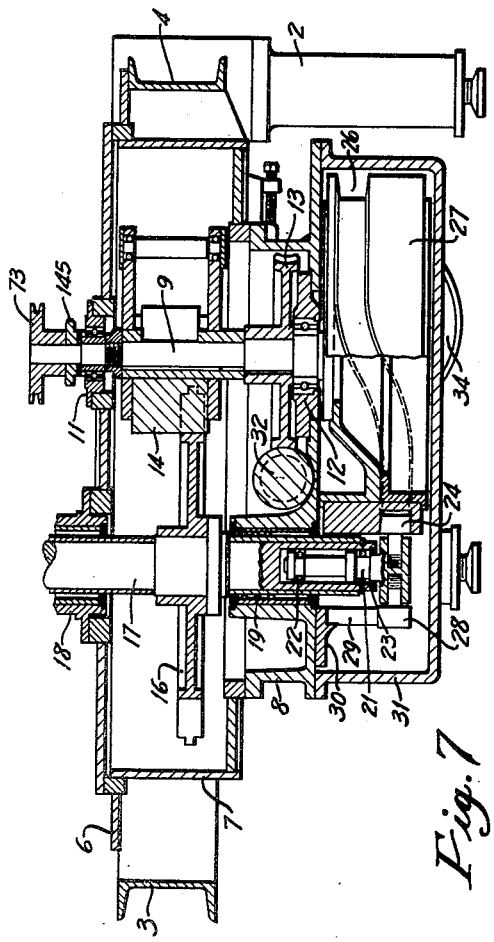
Figure 8:
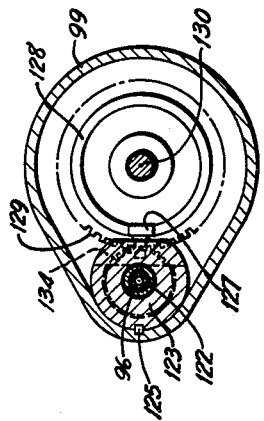

The preferred embodiment of the invention is illustrated in the accompanying drawings, in which Fig. 1 is a side view of my multi-color decorating machine; Fig. 2 is a plan view thereof; Figs. 3 and 4 are horizontal sections taken on the lines III—III and IV—IV, respectively, of Fig. 1; Fig. 5 is an enlarged fragmentary vertical section of the upper part of the machine taken substantially on the line V—V of Fig. 2, and showing a piece of ware being decorated; Fig. 6 is a similar vertical section taken substantially on the line VI—VI of Fig. 2, and showing the table in its lower position; Fig. 7 is a vertical section of the lower part of the machine taken on the line VII—VII of Fig. 4; Fig. 8 is a horizontal section of a decorating device taken on the line VIII—VIII of Fig. 5; Fig. 9 is an enlarged side view, partly in section, of a squeegee; and Fig. 10 is a fragmentary view of the lower part of the squeegee turned ninety degrees from its position in the preceding figure.

Referring to the drawings, the machine has three tall legs 1 and one short leg 2. The lower portions of the legs are connected by horizontal channel members 3 and 4. The upper portions of the tall legs support a metal casting which forms the top 5 of the machine. Mounted on top of three of the channel members is a base plate 6 which supports a Geneva drive housing 7, as shown in Figs. 1, 4 and 7. The bottom of this housing supports a gear housing 8. Extending vertically through the two housings is a rotor shaft 9 that is journaled in bearings 11 and 12. Directly above the lower bearing a worm gear 13 is rigidly mounted on the shaft, and above this gear in the Geneva drive housing a Geneva rotor 14 is keyed on the shaft. The rotor cooperates with a Geneva spider 16 rigidly mounted on a vertical table shaft 17. This shaft is rotatably mounted in a bearing 18 supported by the Geneva drive housing, and also in a bearing 19 formed in the bearing housing. These bearings are of such form as to permit the table shaft to move vertically in them.

The table shaft is supported by a post 21 in the shape of an inverted T. The post extends up into an axial passage in the lower end of the shaft, where they are connected by a radial bearing 22 and a thrust bearing 23. The post is supported by a cam follower roller 24 that is mounted on one end of the lower part of the post and is disposed in a groove 26 in a cylindrical cam 27 carried by the lower end of rotor shaft 9. To keep the post from turning, the other end of its lower part carries a roller 28 that can move up and down in a vertical slot 29 in a guide bracket 30 fastened to the bottom of gear housing 8. The cam and T post are enclosed in a housing 31. When the cam rotates, it raises and lowers post 21 and thereby raises and lowers the table shaft which is supported by that post. At the same time, the table shaft is free to be rotated by the Geneva drive. The Geneva rotor has enough depth to insure its staying in engagement with the spider, whether the spider is up or down.

To rotate cam 27 and the Geneva rotor, the worm gear 13 on the rotor shaft is driven continuously by a horizontal worm 32 journaled in the gear housing. One end of the worm shaft projects from the housing and is driven through a belt drive 33 (Fig. 4) from an electric motor 34 suspended from a plate 35 that is secured to the bottom of the two channel members 4.

As the Geneva rotor revolves, it periodically swings the Geneva spider a predetermined number of degrees. The machine illustrated is provided with six stations, so the spider is designed to rotate sixty degrees for each revolution of the rotor. Rigidly mounted on top of table shaft 17 is a horizontal table 37 that is provided, in this case, with six peripheral recesses spaced sixty degrees apart. Rigidly mounted in each recess is a cylindrical chuck member 38, the upper end of which is encircled by a resilient ring 39 of rubber or the like. As shown in Fig. 5, the inside of the chuck member is divided into upper and lower chambers by a horizontal partition 40. The center of this partition is provided with an opening in which one end of an air pipe 41 is mounted. The pipe extends from the chuck member inward beneath the table and then up through it to a three-way valve 42 mounted on a ring 43 that is supported by the upper end of an open top vacuum cylinder 44 bolted to the top of the table hub. The valve also is connected by a pipe 46 with an opening into the lower part of the cylinder. The third opening of the three-way valve forms an inlet 47 connecting with the atmosphere. The valve is provided with a valve stem 48 which is moved to connect a chuck pipe 41 either with a pipe 46 to the vacuum cylinder or with the valve inlet 47.

Each valve stem is actuated by a lever 49 that is pivotally connected to the inner end of the valve and has a roller 51 on its upper end adapted to be swung in or out by means of two actuating rollers 52 and 53 suspended from a bracket 54. The bracket is mounted on a hollow post 56 that extends through the top 5 of the machine, in which it is rigidly mounted. The lower end of this post carries a stationary piston 57 that fits in the cylinder 44 which moves up and down on the piston when the table is raised and lowered by cam 27. The valve pipes 46 connect to the cylinder below the piston. Mounted on top of the hollow post is a vacuum tank 58 from which air is exhausted by a vacuum pump 59 mounted on top of the machine. When the upper end of a valve lever 49 is swung outward by a roller 52, the valve connects the vacuum cylinder with a chuck to pull a piece of dinnerware 60 resting on the chuck down tightly onto the chuck so that it will not move. The rubber chuck ring 39 forms a seal between the ware and chuck. The vacuum cylinder and its piston also form a counterbalance that tends to lift the table and thereby helps cam 27 do so.

The ware on this machine is decorated when the table is stationary in its upper position. Also, this particular six station machine has a loading station, four decorating stations and an unloading station. At the loading station a piece of ware is deposited on each successive chuck when the table is raised. Any suitable ware-feeding mechanism can be used, unless it is preferred to feed the machine by hand. The feeding mechanism illustrated in Figs. 1, 3 and 6 of the drawings is novel, but as it forms no part of the invention claimed herein it will not be described in much detail.

The feeder includes a hollow ring 65 supported at one side by the short leg 2 of the machine in a position where the axis of the ring is aligned with the axis of any chuck at the loading station. Inside the ring is a ring gear 66 that is rotated continuously by a pinion 67 on the upper end of a shaft 68 that has its lower end journaled in a bearing 69 mounted on base plate 6. This shaft supports a pulley 71 that is driven by a belt 72 from a pulley 73 on the upper end of rotor shaft 9. At three locations 120° apart, the inner wall of the hollow ring is provided with inwardly offset portions, in each of which a gear 74 is disposed. The three gears mesh with the encircling ring gear. Each gear 74 drives a shaft that extends down into the outer end of an elongated gear box 76 that projects under the space encircled by the hollow ring. The inner end of the gear box supports a feeding screw 77 above it, and the screw is driven continuously by the gears in the gear box. The pitch of the threads 78 on the three screws is such as to feed one piece of ware at a time from the bottom of a stack of ware piled on the screws. As each piece of ware leaves the screws it drops onto the underlying chuck, where it is held by vacuum, due to the fact that actuating roller 52 is in such a position as to be struck by valve stem roller 51 just before the successive chucks reach the loading station, whereby each valve is caused to connect the vacuum cylinder with a chuck. The upper portions of the feed screws are journaled in brackets 79 that are connected to the top of the hollow ring by locking screws 80 coaxial with gears 74. When the locking screws are loosened, brackets 79 and gear boxes 76 can be swung to change the positions of the feed screws. In this way the feeder can be adjusted to different size ware. Below its thread 77 each feed screw carries a centering button 81. The three buttons simultaneously engage the ware leaving the feed screws and center it relative to the underlying chuck about to receive it. Engagement of the centering button with the ware stops rotation of the feed screws, which is permitted by a friction clutch 82 in the power shaft 68.

At each of the decorating stations the ware is decorated with a different color, so that the final decoration is in four colors. Although the decorating may be done in various ways, with this machine it is preferred to do it by means of silk screening. As is well known, in this method of decorating ceramic color is forced through a screen of silk or other suitable material containing perforations in the form of the desired decoration. The color penetrating the screen engages the ware that is disposed against the lower surface of the screen.

According to this invention, each of the four decorating screens 85 is supported by a ring 86 that is adjustably connected to an annular frame 87 by means of clips 88. Each frame is provided with three peripheral slots 89, all extending in the same direction, which fit over the lower ends of rods 91 that are vertically adjustable in sleeves 92 projecting from arcuate plates attached to the bottom of the machine top. Nuts 93 hold the frames on the rods. Before a frame is applied to the rods, the screen ring is correctly positioned relative to the frame by means of a jig (not shown), so that the center of the screen will lie directly over the center of the underlying chuck, and so that the decorations applied to a piece of ware by the different screens will register with one another.

To cause each screen to lie parallel to the brim of the underlying ware, the central portion of the screen is depressed by a circular pressure member 95 that engages its upper surface, as shown in Fig. 5. This member is mounted on the lower end of a tubular shaft 96, the upper portion of which is threaded in a sleeve 97 that is rotatably mounted in a tubular boss 98. The boss has its upper end rigidly connected to the top of a projection on a housing 99 that is mounted on the top 5 of the machine. Secured to the upper end of threaded sleeve 97 is a hand wheel 101, so that the sleeve can be turned. To keep the shaft from turning with the sleeve, its upper end is clamped in a bar 102 that is slidably mounted on a vertical rod 103 projecting from the top of the housing projection. Consequently, when the hand wheel is turned, the tubular shaft and the pressure member are raised or lowered by the threaded sleeve in order to depress the center of the screen the desired amount.

Since it is necessary that the color applied to the ware at any decorating station be dry enough to keep it from sticking to the bottom of the screen at the next station and thereby smearing the decorations, a hot color is used which will dry or harden the instant it engages the cooler ware. This color is fed to the top of each screen from the lower end of a funnel-like color reservoir 105 supported from the side of the top of the machine. The color in the reservoir is maintained in the desired fluid condition by keeping it hot by means of an electrical resistor 106 wrapped around the hollow stem of the reservoir. The temperature of the color can be maintained substantially constant by controlling the electrical resistor by means of a thermostat (not shown) attached to the reservoir. To keep the color from hardening on the screen, an electric resistance heater 107 encircles the upper part of pressure member 95. This resistor is connected to a suitable source of electricity by means of wires 108 that extend up through tubular shaft 96.

In order to spread the color over each decorating screen and force it through the perforations therein, so that a colored design will be applied to the ware beneath, a squeegee 110 is provided which travels continuously in a circle directly above the brim of the ware being decorated. This squeegee is pivotally supported near its upper end by a horizontal rod 111 that extends back past tubular shaft 96 and into the lower end of an arm 112 that is pivotally connected to the lower end of a bracket 113 projecting from a collar 114. The rod can be inserted any desired distance into the arm and locked by a set screw 116. The pressure of the squeegee against the screen is controlled by a coil spring 117 encircling a pin 118 projecting from the collar and extending loosely through the upper end of the arm. The spring is pressed against the arm by means of a nut 119 screwed on the outer end of the pin. The distance that the upper end of the arm can be moved toward the collar is controlled by a set screw 120 threaded in the arm.

The collar 114 is clamped on the lower end of a short hollow shaft 122 encircling tubular shaft 96. The hollow shaft is rotatably mounted inside of a sleeve 123 by means of combination radial and thrust bearings 124. This sleeve is slidable vertically in a tubular portion of housing 99, in which the sleeve is prevented from rotating by means of a spline 125. The sleeve is supported by a cam follower roller 127 which rests on a circular cam 128 that is rigidly mounted on a gear 129 secured to a short vertical shaft 130 journaled in housing 99. The roller is pressed down against the cam by means of a coil spring 132 compressed between the top of the sleeve and a large nut 133 threaded on tubular boss 98. The gear 129 meshes with a wide gear 134 rigidly mounted on hollow shaft 122 inside the sleeve, the side of the sleeve being provided with an opening to permit the gears to engage each other. It will thus be seen that as the large gear and cam rotate, they rotate the hollow shaft in the sleeve and move it and the sleeve up and down together, thereby rotating the squeegee around the decorating screen and periodically raising it away from the screen so that it will not spread color through the screen when no ware is engaging the screen. The cam also prevents the squeegee from engaging the screen for more than 360 degrees, which would cause application of a double thickness of color to part of the decoration.

All of the short shafts 130 are driven by sprockets 136 on their upper ends by a chain 137 that extends around all of the sprockets and intermediate idling sprockets 138, as shown in Fig. 2. The short shaft 130 at the first decorating station has a second sprocket 139 mounted on its upper end, which is driven continuously by a chain 141 from a sprocket 142 on the upper end of a shaft 143 journaled in the adjacent hollow leg 1 of the machine. Shaft 143 is driven at its lower end by a chain 144 (Fig. 1) that passes around a sprocket 145 mounted on the upper end of the rotor shaft directly below pulley 73.

The construction of each squeegee 110 is novel and important. If the squeegee blade were pivoted in its support and one end of the blade were raised, the opposite end would have to lower. In many cases it is desirable to raise or lower one end of the blade without affecting the other end. To permit this, as shown in Figs. 9 and 10, the rubber squeegee blade 150 disclosed herein is mounted in a block 151 that has lateral shoulders 152 and a convex upper surface provided with a central recess 153. The block extends through a slot 154 through the lower end of a holder 156. The lower edges of the slot underlie the block shoulders to support the block. The block is pressed downward by a pin 157 projecting from an axial bore through the holder. The pin is pressed downward by a coil spring 158 held in place by a screw 159 in the upper end of the bore. It will be seen that the blade can be removed for replacement by merely pushing on one end of block 151 to slide it out of the holder. Also, the blade can be pushed straight up in slot 154 or it can be tilted at any angle without one end of the blade having to move down as the other end is moved up.

It is important to prevent any squeegee from forcing color through a screen in case there is no ware on the underlying chuck or in case a piece of ware is not properly positioned on the chuck. In either of these instances, the upper chamber of the chuck member will not be sealed and it would therefore be impossible to reduce the air pressure in that chamber. This fact is taken advantage of in order to prevent the squeegee from moving down into screen-engaging position. It is done by connecting the chuck by means of a pipe 161 to the bottom of a switch-actuating device 162 mounted on the table. Each of these devices includes a flexible diaphragm 163, to which the lower end of a sliding stem 164 is rigidly connected. The stem and diaphragm are urged upward by means of a coil spring 165 encircling the stem. Reduction of the air pressure below the diaphragm will cause the diaphragm to move downward and thereby lower the stem. This happens every time a vacuum is created in the chuck connected with that diaphragm. At all other times the stem is held in its upper position by the spring. If a vacuum is not produced in the chuck, the elevated stem will open an electric switch 167 when the table is raised. There is one of these switches above stem 164 at every decorating station. As shown in Figs. 1 and 5, they are mounted on the lower ends of rods 168 attached to a plate 169 supported by the central hollow post 56. When a switch 167 is opened, it opens an electric circuit to a solenoid coil 171 attached to the side of the tubular portion of the housing 99 nearest the switch. When the circuit to the coil is opened, a coil spring forces a locking pin 172, which is connected to the core of the coil, through an opening in the side of the housing and into a hole 173 in the side of sleeve 123. The pin holds the sleeve in its upper position when the receding portion of cam 128 otherwise would permit the sleeve to descend. When the table 37 is lowered again, the open switch 167 closes, the coil 171 is energized and the locking pin is pulled out of the sleeve so that the squeegee can be lowered the next time the table is indexed; provided a piece of ware is seated properly on the next chuck.

As each chuck leaves the last decorating station, the roller 51 on the valve associated with that chuck strikes actuating roller 53 (Fig. 3), by which the valve is operated so that it will connect its chuck pipe 41 with its air inlet 47 to release the vacuum in the chuck. The decorated ware on the chuck then can be lifted from the chuck at the unloading station.

It should now be clear that every time the table is raised a piece of undecorated ware is deposited by the feeder on the underlying chuck, and pieces of ware on the preceding four chucks are decorated by color forced through the four screens by the revolving squeegees. By using hot color the color applied to the ware at each decorating station is dry enough by the time the ware is indexed to the next station to avoid smearing or running together with the color that is then applied. The rotation of the table does not need to stop before it is raised, because the raising cam can be shaped to start the table moving upward while it is still rotating. Also, the rotation of the table can be started again before it reaches its lower level.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A multicolor dinnerware decorating machine comprising a rotatable horizontal table, chucks rigidly mounted thereon at circumferentially spaced intervals for receiving and tightly holding ware, means for intermittently rotating the table to index the chucks from station to station, decorating screens mounted above some of said stations, means for raising the table while the chucks are dwelling at said stations to position the upper surface of the ware nearly in contact with said screens, a stationary support above each screen, a vertically movable member slidably mounted in each support and provided with a central vertical passage, a rotatable member journaled on a vertical axis in each of said passages, a squeegee engaging the top of each screen, means connecting each rotatable member with the underlying squeegee, means for rotating said rotatable members continuously, cams for periodically raising said vertically movable members to lift the squeegees out of engagement with the adjoining screens, said rotatable members having central vertical passages therethrough, a stationary shaft extending down through each of said last-mentioned passages and a pressure member mounted on the lower end of each shaft for holding the central portion of the underlying screen in position.

2. A multicolor dinnerware decorating machine comprising a rotatable horizontal table, vacuum chucks mounted thereon at circumferentially spaced intervals for receiving and tightly holding ware, means for intermittently rotating the table to index the chucks from station to station, means for reducing the air pressure in the chucks when ware is seated thereon, a decorating screen mounted above each of some of said stations, means for effecting relative vertical movement between the chucks and screens while the chucks are dwelling at said stations to position the screens and the upper surface of the ware nearly in contact, a rotatable squeegee above each screen for forcing color therethrough onto ware on an underlying chuck, means for moving the squeegee vertically toward and away from the screen, means for locking the squeegee in its upper position, means normally holding said locking means in inoperative position, and means carried by the table for rendering said holding means inoperative when the air pressure in the underlying chuck is not reduced, whereby the locking means will lock the squeegee in its upper position.

3. A multicolor dinnerware decorating machine comprising a rotatable horizontal table, vacuum chucks mounted thereon at circumferentially spaced intervals for receiving and tightly holding ware, means for intermittently rotating the table to index the chucks from station to station, means for reducing the air pressure in the chucks when ware is seated thereon, a decorating screen mounted above each of some of said stations, means for effecting relative vertical movement between the chucks and screens while the chucks are dwelling at said stations to position the screens and the upper surface of the ware nearly in contact, a rotatable squeegee above each screen for forcing color therethrough onto ware on an underlying chuck, means for moving the squeegee vertically toward and away from the screen, means for locking the squeegee in its upper position, electromagnetic means normally holding said locking means in inoperative position, an electric switch connected with said electromagnetic means, means carried by the table for opening said switch, means for moving said locking means into operative position when said switch is opened, and means actuated by reduced air pressure in a chuck below the squeegee for moving said switch-opening means out of operating position.

4. A multicolor dinnerware decorating machine comprising a rotatable horizontal table, chucks mounted thereon in predetermined position at circumferentially spaced intervals for receiving and tightly holding ware, means for intermittently rotating the table to index the chucks from station to station, means for raising the table while the chucks are dwelling at said stations, and means above the table at some of said stations for decorating the ware on the chucks with different colors when the table is raised, said table raising means including a piston member and a cylinder member, one of said members being rigidly mounted above the table and the other member being rigidly connected to the top of the table, and means for maintaining the air pressure in the cylinder member subatmospheric, whereby said members aid in raising the table.

5. A multicolor dinnerware decorating machine comprising a rotatable horizontal table, chucks mounted thereon in predetermined position at circumferentially spaced intervals for receiving and tightly holding ware, means for intermittently rotating the table to index the chucks from station to station, means for raising the table while the chucks are dwelling at said stations, and means above the table at some of said stations for decorating the ware on the chucks with different colors when the table is raised, said table raising means including a piston member and a cylinder member, one of said members being rigidly mounted above the table and the other member being rigidly connected to the top of the table, and means for maintaining the air pressure in the cylinder member subatmospheric, whereby said members aid in raising the table, and conduits connecting the chucks with said cylinder member to reduce the air pressure in said chucks when ware is placed thereon.

6. A multicolor dinnerware decorating machine, comprising a plurality of laterally spaced chucks for receiving and tightly holding ware, means for indexing the chucks laterally from station to station and raising them at each station, feeding apparatus above the chuck at one of said stations for supporting a pile of dinnerware and feeding a different piece of the ware from the bottom of the pile downward toward each successive chuck while it is raised, and decorating apparatus above the chucks at others of said stations for decorating the ware on the chucks with different colors when they are raised.

References Cited in the file of this patent

UNITED STATES PATENTS

| Number | Name | Date |
|---|---|---|
| 1,182,111 | Standeford | May 9, 1916 |
| 2,124,011 | Smith | July 19, 1938 |
| 2,261,255 | Jackson | Nov. 4, 1941 |
| 2,339,423 | Pollard | Jan. 18, 1944 |
| 2,484,671 | Bauman | Oct. 11, 1949 |
| 2,605,700 | Martin | Aug. 5, 1952 |
| 2,609,747 | Schwartz | Sept. 9, 1952 |